United States Patent [19]
Turloff et al.

[11] Patent Number: 5,111,188
[45] Date of Patent: May 5, 1992

[54] ELECTRONIC FLUID-LEVEL SENSOR WITH THREE STATE INDICATOR

[75] Inventors: Harry E. Turloff, 3378 Clyde Dr., Port Huron, Mich. 48060; Kirk G. Kitchen; Igor Levin, both of Ann Arbor, Mich.

[73] Assignee: Harry E. Turloff, Port Huron, Mich.

[21] Appl. No.: 417,266

[22] Filed: Oct. 5, 1989

[51] Int. Cl.⁵ .......................................... G08B 21/00
[52] U.S. Cl. .................................. 340/623; 340/624; 73/313; 73/307; 33/366; 33/378
[58] Field of Search .................. 340/623, 624; 73/307, 73/308, 310, 313, 314, 861.11, 861.12, 861.15, 861.16; 324/655, 656; 33/367, 378, 366

[56] References Cited

U.S. PATENT DOCUMENTS

| | | | |
|---|---|---|---|
| 4,080,828 | 3/1978 | Akita et al. | 340/624 |
| 4,144,741 | 3/1979 | Nakamoto et al. | 73/861.11 |
| 4,447,743 | 5/1984 | Bean et al. | 73/313 |

Primary Examiner—Edward L. Coles, Sr.
Assistant Examiner—Jill Jackson
Attorney, Agent, or Firm—Krass & Young

[57] ABSTRACT

The invention is an electronic sensor for producing an indication of fluid level in a hose or tube and an electronic indicating circuit that uses the sensor's indication of fluid level for asserting one of three indicators depending upon whether the fluid level is above a reference by a small distance, within the small distance of the reference, or below the reference by the small distance. A float retaining a core having a relative magnetic permeability significantly greater than one is supported by fluid near three vertically disposed coils. The center coil is excited by a source of alternating current and the position of the core above or below the center coil determines the voltages present in the top and bottom coil. The voltages present in the top and bottom coils are rectified and added in polarity opposition to produce an indication of fluid level. A plurality of voltage comparators, supplied by the indication of fluid level and fixed voltages, are used to assert the appropriate indicator. The indicators are pulsed on and off by a switchable oscillator when the primary supply voltage falls below a predetermined level. In the preferred embodiment, the indicators are lamps, the lamps are placed remotely from the sensor, and a source of adjustable voltage is added to the indication of fluid level.

19 Claims, 5 Drawing Sheets

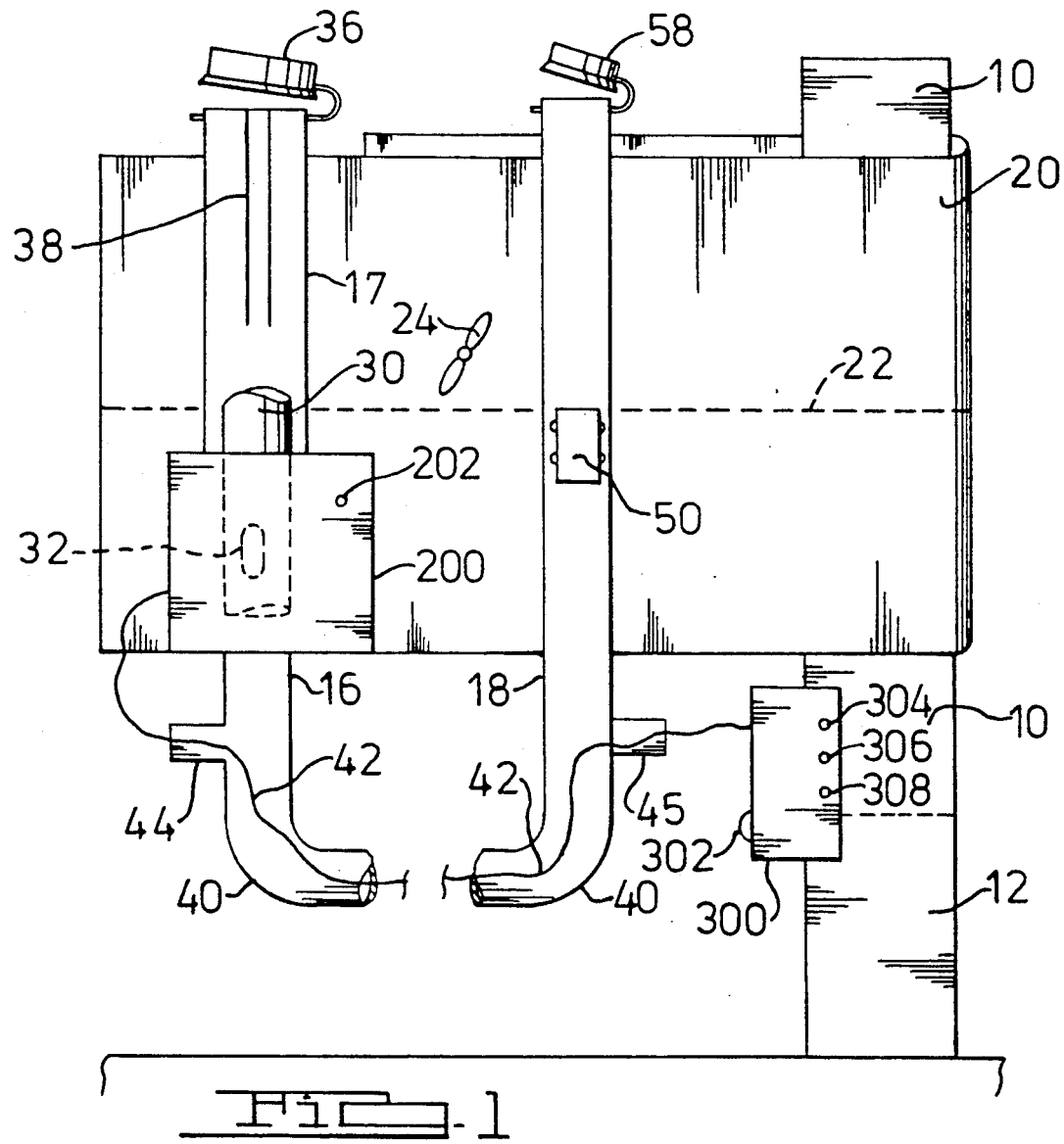

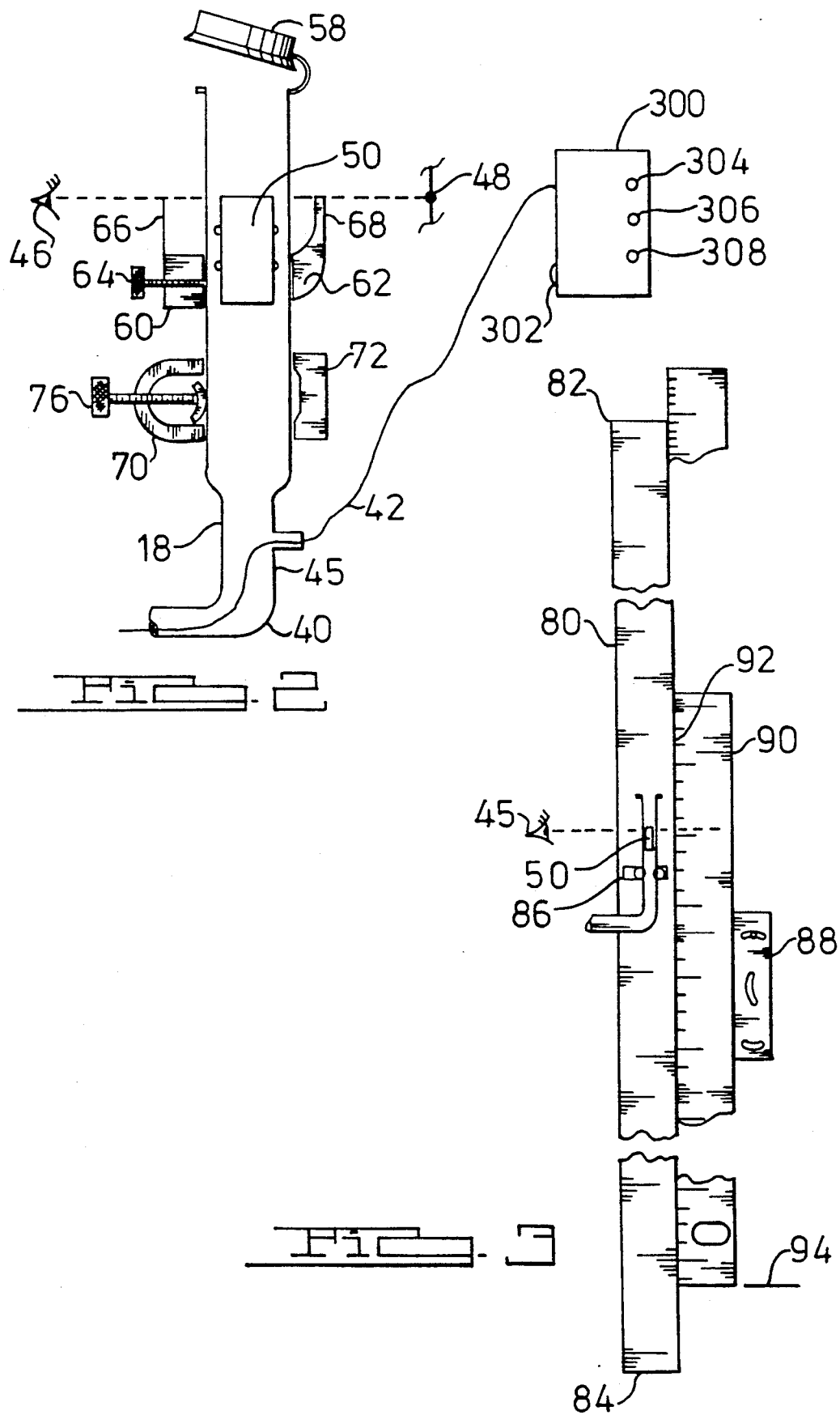

ELECTRONIC FLUID-LEVEL SENSOR WITH THREE STATE INDICATOR

FIELD OF THE INVENTION

This invention relates to electronic apparatuses used to sense and indicate fluid-level. The present invention is used in an improved level indicating and elevation indicating system that uses a hose containing fluid (the system). A related co-pending U.S. patent application is Ser. No. 07/299,788 filed Jan. 18, 1989.

BACKGROUND OF THE INVENTION

The system, of which the present invention is a part, is an improvement and an extension of the device and apparatus of inventor Turloff's prior U.S. Patents (U.S. Pat. Nos. 4,231,163 and 3,849,898).

Mechanical methods for detecting when the surface of a fluid, or a float supported by fluid, has reached a specified level are known. Such methods require part of the buoyancy force of a float to be used to actuate a switch. This may be done by a float moving a magnet close enough to a magnetically actuating switch or by pushing against switch contacts. Such mechanical methods have the characteristic low repeatability and hysteresis of force actuated switches made worse by the inherent elasticity of a float supported by fluid. Additionally, they must be protected from the dirt, dust, and corrosive vapors likely to be present.

Electric methods for detecting when the surface of a fluid has reached a specified level are known. Such methods act by using the decrease of resistance between electrodes that penetrate into the hose when the electrodes are covered by a conducting fluid. For such methods to operate, the fluid used must be conductive, the electrodes must be able to be insulated from each other, and the resistance between the electrodes and the fluid must stay within limits. Since many low cost conductive fluids tend to be chemically active (such as water plus acid or water plus a salt) one must use some care in handling the fluids and one will prefer to use electrodes of a noble metal. U.S. Pat. No. 4,434,561 teaches the use of a fluid having at least the conductivity of "tap water" when the electrodes are used with an amplifier. The same patent shows the characteristic of such an electric method to have a single indicator.

At best, the known methods may be able to indicate either that the level of the surface of a fluid is within some small distance of, or below, a reference or, in the alternative, that the level of the surface of a fluid is within some small distance, or above, a reference. There is therefore a need in the art to provide a method for accurately determining when the level of the surface of an arbitrary fluid is within a certain small distance of a reference, above the same certain small distance of a reference, or below the same certain small distance of a reference. Without such a last described method, the overall accuracy and repeatability of such systems is significantly limited.

It has been known to sight across the surface of a fluid to a target point. Such surfaces are not flat, but have significant curvature due to the surface tension of the fluid and the lack of "wetting" of many fluids. This results in some uncertainty as to what the level of the surface is and some parallax error. There is therefore a need in the art for a method of accurately determining a horizontal plane that is a fixed distance from the surface of the fluid.

SUMMARY OF THE INVENTION

The preferred embodiment of the present invention is the electronic part of an improved level indicating and elevation indicating system that uses a hose containing fluid.

The invention is an electronic sensor for producing an indication of fluid level in a hose or tube and an electronic indicating circuit that uses the sensor's indication of fluid level for asserting one of three indicators depending upon whether the fluid level is above a reference by more than a small distance, within the small distance of the reference, or below the reference by more than the small distance. In the preferred embodiment, the indicators are lamps and the lamps are placed remotely from the sensor.

The preferred embodiment of the invention is particularly advantageous in that it allows one person to be able to operate the entire system.

A BRIEF DESCRIPTION OF THE DRAWINGS

One will better understand the present invention by referring to the following detailed description while consulting the accompanying drawings, where the same reference numerals are used to refer to the same parts throughout the several views, and in which:

FIG. 1 is a perspective view of most of the parts of the system, as they are arranged for calibration, and shows the control-end and hose-end mounted on the control sleeve, upper column, and lower column.

FIG. 2 is a cross section view of the hose-end showing its parts, the outside of the signal box, and how one's eye aligns with the front sight, hose float, rear sight, and target.

FIG. 3 is a perspective view of the split rod with the hose-end attached thereto.

FIG. 8 is block diagram of alternative communication and display methods.

DETAILED DESCRIPTION OF THE PREFERRED EMBODIMENT

Figure 4:
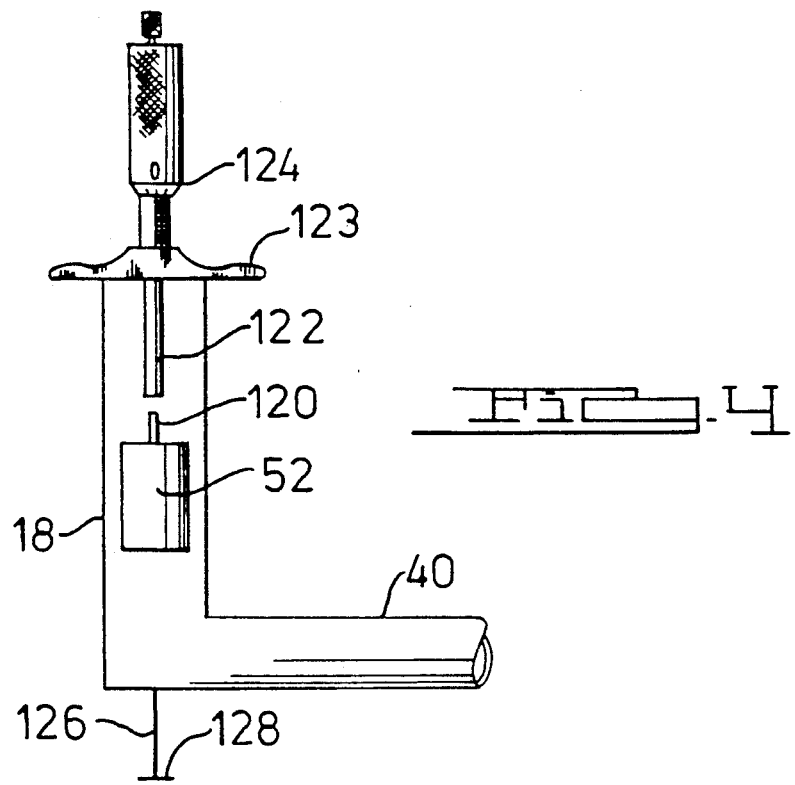
FIG. 4 is a perspective view of an alternative embodiment of the split rod that uses a micrometer.

FIG. 1 shows the general nature of the system is a hose 40 almost entirely filled with a fluid, a control-end 16 of the hose 40 with a control-end-tube 17 containing a control float 30 within control box 200, and a hose-end 18 of the hose 40 containing hose float 50 and associated with signal box 300. The position of control float 30 is sensed by the electronics contained within control box 200, which is affixed to control sleeve 20. After calibration, the essence of the system's operation is that control box 200 communicates with signal box 300, through wires 42, when the fluid surface in control-end-tube 17 is above, below, or on a reference height and thus one knows whether hose float 50 is above, below, or on the same reference height. Below are described the details of various improvements to the basic system.

In FIG. 1 one sees how the system is arranged for calibration. Calibration is the adjustment of the parts of the invention so only when a certain indication is received from signal box 300 is a reference height at the control-end 16 of the hose 40 in the same horizontal plane as hose float 50 found at the hose-end 18 of the hose 40. The indication of this same height condition is the assertion of the OK-light 306 in signal box 300. Calibration is effected by:

Firstly: Temporarily and slidably attach the hose-end 18 onto control sleeve 20 to be vertical and parallel to the control-end-tube 17. This is the arrangement shown on FIG. 1.

Secondly: Remove control-end cap 36 and hose-end cap 58 so the fluid will balance at both ends of the hose.

Thirdly: Turn the electronics off (using on-off switch 302), cause the top of hose float 50 to be in the same horizontal plane as horizontal operating line 22 by adjusting the hose-end 18 vertically or changing the amount of fluid or varying the volume of hose 40; turn on the electronics (using on-off switch 302) and use electrical adjuster 202 to cause OK-light 306 to be asserted.

Lastly: Close cap 58 so that no fluid is lost.

Because of the various buoyancies of control float 30 and hose float 50, and because of the particular density of the fluid used, operating line 22 may not be in the same plane as the surface of the fluid when calibration is completed. Inherently, after calibration, whenever OK-light 306 is asserted and the fluid is not in motion, the top of hose float 50 is in the same horizontal plane as operating line 22.

FIG. 1 also shows a preferred method for maintaining control float 30 within sensing range of control box 200. This is effected by mechanical float limiter 38 comprising a hollow rod, open at both ends, removably attached to the top of the control-end-tube 17. When mechanical float limiter 38 is removed, control float 30 is readably accessible merely by elevating the hose-end 18 and grasping the control float 30 as it bobs to the top of the control-end-tube 17. When mechanical float limiter 38 is in place, control float 30 is blocked from traveling beyond the high side sensing range of control box 200. The use of mechanical float limiter 38 significantly assists in making it possible for the control-end 16 to be unattended during normal operation.

Still further, FIG. 1 shows the preferred method of dressing the wires 42 communicating between the control box 200 and the signal box 300. Conveniently placed below control float 30 and hose float 50 are first T fitting 44 and second T fitting 45, respectively. The opposing arms of each T fitting are spliced into hose 40, allowing free passage of the fluid, and the perpendicular arm receives wires 42. Suitable caulking is used to prevent leakage of fluid. The wires 42 are placed within hose 40 between the two T fittings. This method of dressing the wires 42 results in the wires being protected by the hose 40 and in the convenience of merely having to run the hose between control-end-tube 17 and hose-end 18.

Even further, FIG. 1 indicates the construction of the control sleeve 20, upper column 10, and lower column 12. In the preferred embodiment of the system, the control sleeve 20, upon which the control-end-tube 17 and control box 200 are attached, is constructed of a sheet of rigid transparent flat material that has been wrapped around the upper column 10 while the area touching the upper column 10 is plastic. The control sleeve 20 is clamped to upper column 10 by the squeezing action of wing nut and bolt 24 running between the front and back sides of control sleeve 20. Operating line 22 is perpendicular to both the upper column 10 and the control-end-tube 17. The upper column 10 and the lower column 12 are rigid cylinders of the same diameter, and are joined together using a headless screw and mating threads cut into the center of each cylinder. Thus the upper column 10 is able to be detached from the lower column 12. Furthermore, the upper column 10 (with attached control sleeve 20, control-end-tube 17, and control box 200) may be detached from the lower column 12 and moved to a place where it is desired to have operating line 22 be a reference.

FIG. 2 shows the hose-end 18 of the hose 40. The signal box 300 is found in the neighborhood of the hose-end 18, its connecting wires 42 enter hose 40 through second T fitting 45, and, due to its proximity, signal box 300 is readably visible to the operator at the hose-end 18. The signal box 300 may be temporarily attached to the hose-end 18. The top of hose float 50 is flat and the hose float 50 is constructed so that when the float is floating in fluid the flat top will be in a horizontal plane. To facilitate the determination of the horizontal plane tangent to the flat top of hose float 50, a hose float indicator 60 is placed around the hose-end 18 proximate to the hose float 50. The preferred embodiment of the hose float indicator 60 comprises a collar 62 of stiff material having an inside diameter slightly larger than the outside diameter of the hose-end 18, which is placed around the hose-end 18; an attachment device 64 that keeps the hose float indicator 60 in place; a front sight 66 in the form of a vertical pin imbedded in the front of collar 62; and a back sight 68 formed from a flat toped vertical projection of the back of collar 62. The front sight 66 is adjusted so that its tip and the top of back sight 68 lie in a horizontal plane when the hose-end 18 is vertical. Thus, as shown on FIG. 2, the projection of an operator's eye 46 (aligned with the top of front sight 66, the flat top of hose float 50, and the top of back sight 68) onto target-point 48, lies in a well defined horizontal plane. Assuming calibration was carried out as detailed above, if such an alignment occurs when OK-light 306 is asserted, and thus control float 30 is at its reference level, then target-point 48 is in the same horizontal plane as operating line 22. Once such a target-point 48 is found, one may measure vertical offsets from it. Such determinations are facilitated with the split rod and versatile base improvements detailed below.

Operating line 22 may well be projected onto a scale and will indicate some number of inches plus a fraction of an inch. Even zero offsets are more conveniently effected if the projection of operating line 22 lies on an integer number of inches. In principle, one could move the scale, however, that is usually neither possible nor desirable. What may be done is to loosen wing nut and bolt 24 and slide control sleeve 20 vertically until the projection of operating line 22 is on an integer value of inches (when OK-light 306 is asserted) and then tighten wing nut and bolt 24. Starting with an integer number of inches greatly simplifies, and makes more reliable, the arithmetic used to calculate offsets.

To facilitate the solution of the practical problem of aligning the top of front sight 66, the flat top of hose float 50, and the top of back sight 68, a precision fluid positioner 70 is provided. The precision fluid positioner 70 comprises a yoke 72 surrounding the hose 40 (at any convenient location below hose float 50) and the yoke 72 is held tightly against the hose 40 by pressure plate 74 that is urged against the hose 40 by the captive adjustment knob and screw 76. Thus, varying adjustment knob and screw 76 will change the volume of the hose 40 by a small amount and, in turn, will change the height of the hose float 50 by a small amount (while the surface of the fluid, in both ends, will always be in the same horizontal plane). It has been found that one may dispense with pressure plate 74 if one uses an adjustment knob and screw 76 having a blunt end touching the hose and this constitutes the preferred embodiment of the precision fluid positioner 70.

The objective of accurately determining points that are in the same horizontal plane as operating line 22 is effected by the following:

calibrate the system as detailed above;

move the hose-end 18 to the area where heights relative to operating line 22 are to be determined;

with control-end cap 36 and hose-end cap 58 removed and signal box 300 turned on (using on-off switch 302), raise the hose-end 18 until high-light 304 is asserted, then slowly lower the hose-end 18 until OK-light 306 is asserted;

slide hose float indicator 60 until the top of hose float 50 is approximately level with the top of front sight 66 and back sight 68 and then temporarily snug hose float indicator 60 to the hose 40 with attachment device 64;

sequence between making appropriate small changes to the elevation of the hose-end 18, adjusting the placement of the hose float indicator 60 to have the tops of the sights line up with the top of hose float 50, and adjusting the precision fluid positioner 70 until the top of hose float 50, the top of front sight 66, the top of back sight 68, and target-point 48 are all seen by observer's eye 46 to be in line while OK-light 306 is asserted; and mark, or otherwise note, target-point 48.

Once the hose float indicator 60 has been properly placed, one will find that it is close to the correct position after hose-end 18 has been moved to a new location.

In the preferred embodiment of the system, the inside diameter of the control-end-tube 17 is larger than the inside diameter of the hose 40 and hose-end 18. This arrangement increases the effective sensitivity of the system.

Figures 5, 5A:
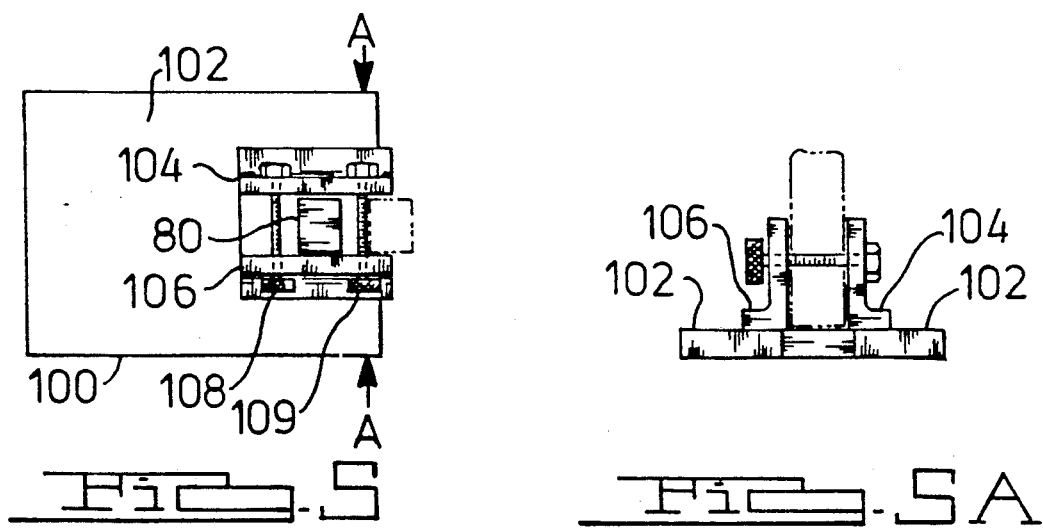
FIG. 5 is a top view of the versatile base and shows a rod clamped therein in cross section.
FIG. 5A is a cross section view of FIG. 5 through plane A—A.

The accurate determination of points that are a known distance above or below the horizontal plane containing operating line 22 is improved by the use of a split rod, shown on FIG. 3, and a versatile base, shown on FIG. 5 and FIG. 5A. The preferred embodiment of the split rod is comprised of a fixed rod 80 and an adjustable rod 90 that are interlocked in such a manner that they may slide vertically with respect to each other. The preferred embodiment uses a tongue-and-groove scheme to effect the sliding attachment. (An alternative embodiment is described later in this section and is shown on FIG. 4.) A scale 92 is placed along the entire length of adjustable rod 90. It may be convenient to have zero units start at foot 94. The hose-end 18 of the hose, with its attendant hose float 50, hose float indicator 60, precision fluid positioner 70, and signal box 300, is slidably clamped to fixed rod 80 by hose holder 86. The hose 40 may side vertically within hose holder 86 and the hose holder 86 may be moved vertically along fixed rod 80. Either the top of adjustable rod 90 is placed against a firm object above the hose-end 18, or fixed rod's bottom end 84 is braced against a firm object below the hose-end 18. Bubble level 88 is used to insure the split rod is vertical. The hose-end 18 is adjusted, in the manner described above, until OK-light 306 is asserted and thus the top of hose float 50 is in the same horizontal plane as operating line 22. Adjustable rod 90 is adjusted vertically until either its foot 94, or some other mark on the adjustable rod 90, is in the desired proximity to the point whose elevation relative to operating line 22 is to be measured. Hose float indicator 60 is used to find the target-point 48 on scale 92 and the difference in height is calculated as the difference between the target-point 48 and foot 94 (or whatever mark on adjustable rod 90 was used).

While the above process for finding relative vertical offsets from operating line 22 may readily be performed by one person, the use of versatile base 100 facilitates the process. FIG. 5 shows the versatile base 100. It comprises a flat rectangular plate 102 with an L bracket 104 attached thereto on one side of a rectangular opening. Fixed rod 80 may be clamped against the L bracket 104 by clamp 106, clamping nut and bolt 108, and clamping nut and bolt 109. Fixed rod 80 may be clamped between the two bolts or forward of clamping nut and bolt 109 so that part of fixed rod 80 protrudes forward of the edge of plate 102. The former position of fixed rod 80 allows the operator to position fixed rod 80 exactly with respect to a reference position by looking down through the opening. The later position of fixed rod 80 also allows fixed rod 80 to be positioned against a reference position that is forward of plate 102. In both cases, fixed rod's bottom end 84 may extend below, be above, or be flush with plate 102 and may also be inclined with respect to the plane of plate 102. Thus, by versatile base 100 being used to hold fixed rod 80, a very wide range of reference positions may be accommodated.

Figure 6:
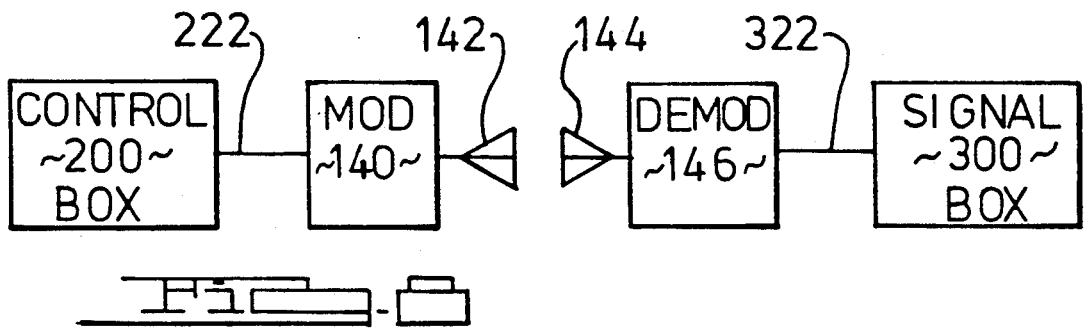
FIG. 6 is an electronic schematic of the control box circuit.
Figure 6:
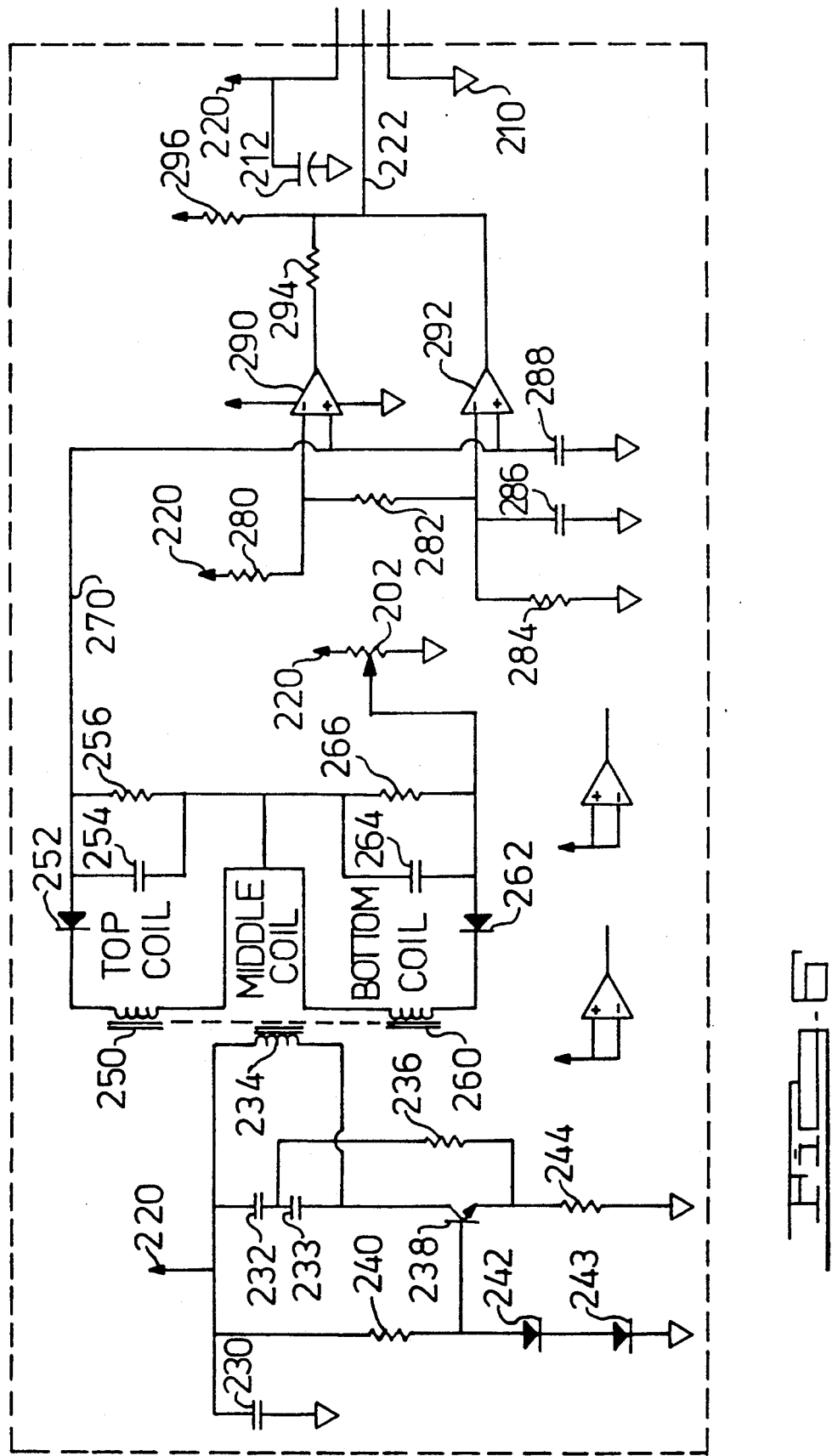
Figure 7:
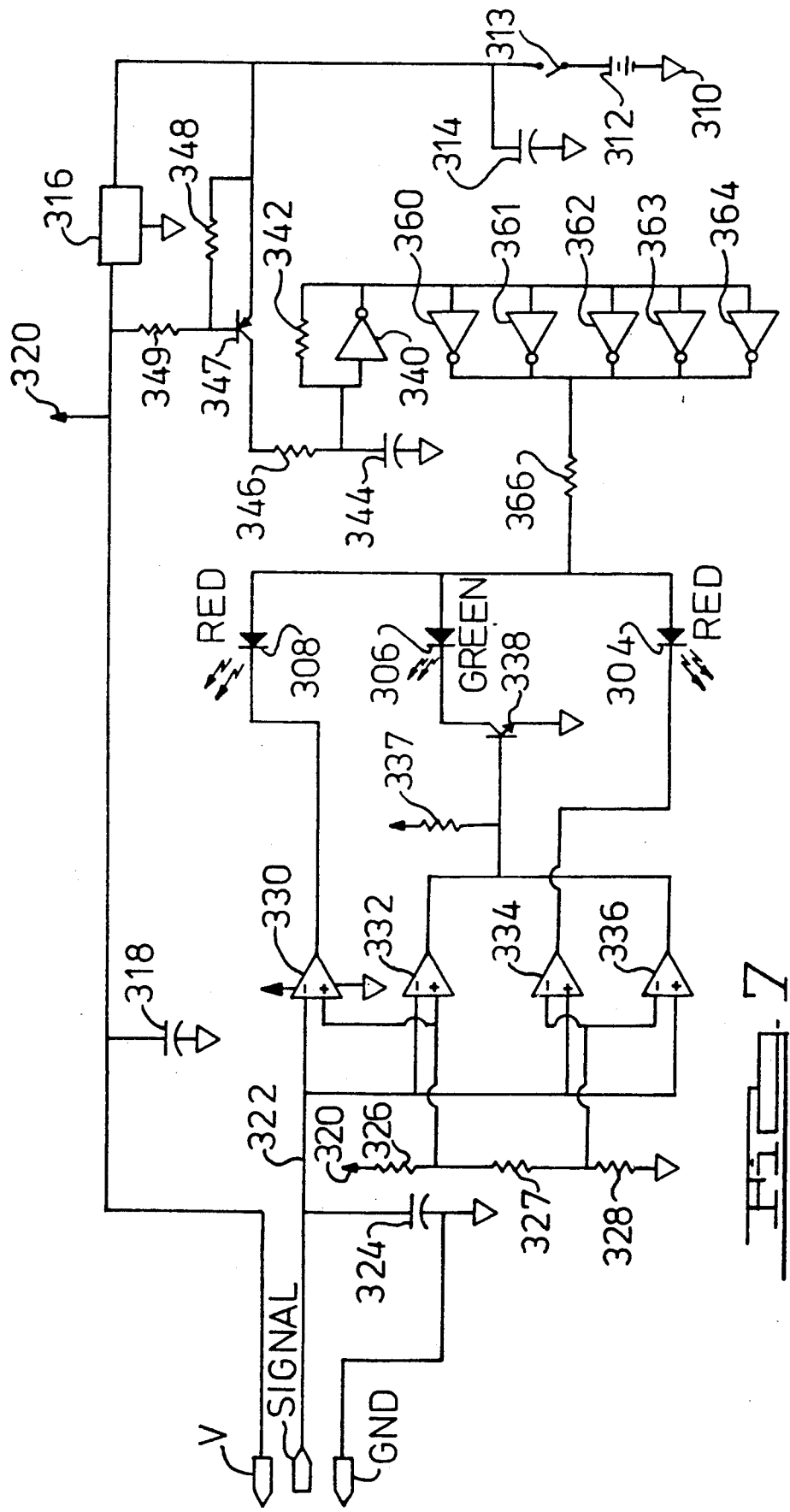
FIG. 7 is an electronic schematic of the signal box circuit.

The following description of the preferred embodiment of the present invention makes particular use of the schematics on FIG. 6 and FIG. 7. TABLE ONE and TABLE TWO lists the electronic parts used.

FIG. 6 shows the schematic of the preferred embodiment of the electronics of control box 200. FIG. 1 shows the placement of control box 200 surrounding control-end-tube 17 and the associated control float 30 within control-end-tube 17. Basically, the electronic method for producing an output signal dependent upon fluid-level is that of inductively exciting two vertically spaced coils with an ac signal, placing a high permeability core 32 within a control float 30 such that the position of the core will determine the relative amount of signal coupled into each of the vertically spaced coils, and forming the output signal from subtracting the rectified voltage induced into the two vertically spaced coils. The vertically spaced coils are labeled 250 and 260 on FIG. 6.

The specifics of operation are as follows:

Regulated 5 volts 220 and electrical common 210 are brought into control box 200 by the method used to communicate with signal box 300 (wires 42 in the preferred embodiment) and these voltages are applied to the circuit as shown on FIG. 6.

A modified Colpitts oscillator is formed from capacitor 232, capacitor 233, middle coil 234, resistor 236, NPN transistor 238, resistor 240, diode 242, diode 243, and resistor 244.

The operating frequency is principally determined by the inductance of middle coil 234 and the effective capacitance of capacitor 232 in series with capacitor 233. The amount of positive feedback is principally determined by the ratio of capacitor 233 to capacitor 232. Amplitude control is effected by the amplitude sensitive bias comprising resistor 240, forward biased diodes 242 and 243, and resistor 244. Middle coil 234 is placed between and essentially equidistant from top coil 250 and bottom coil 260 and each coil is wound around the control-end-tube 17 in the immediate vicinity of where the core 32 of the control float 30 is expected to be during operation of the system. Each coil is wound in the same direction.

Top coil 250 and bottom coil 260 are each connected to a rectifier circuit and the outputs of the rectifier circuits are connected in opposition. Diode 252, capacitor 254, and resistor 256 form the rectifier circuit for top coil 250. Diode 262, capacitor 264, and resistor 266 form the rectifier circuit for bottom coil 260. An adjustable amount of voltage may be added to the output of the rectifier circuit of bottom coil 260 by electrical adjuster 202. In the preferred embodiment of the invention, electrical adjuster 202 is a potentiometer. The difference voltage 270, relative to electrical common 210, is the sum of the positive voltage from electrical adjuster 202, the positive voltage from the rectifier applied to bottom coil 260, and the negative voltage from the rectifier applied to top coil 250, as these voltages are all in series.

Difference voltage 270 is applied to a three state logic circuit primarily formed from voltage comparator 290 and voltage comparator 292. Bypass capacitor 286 and bypass capacitor 288 help to stabilize the circuit. Regulated 5 volts 220 and resistors 280, 282, and 284 bias the inverting input of voltage comparator 290 to roughly 2.53 volts and the inverting input of voltage comparator 292 to roughly 2.47 volts. (The voltages actually differ by about 60 mV.) The difference voltage 270 is connected to both noninverting inputs. The voltage comparators used are such that when the noninverting input is more positive than the inverting input the output looks like an open, and when the inverting input is more positive than the noninverting input then the output sinks current. Thus: (1) When the core 32 is below its reference, and difference voltage 270 is greater than 2.53 volts, the outputs of both voltage comparator 290 and voltage comparator 292 look like opens and signal voltage 222 is about 5 volts. (2) When the core 32 is above its reference, and difference voltage 270 is less than 2.47 volts, the outputs of both voltage comparator 290 and voltage comparator 292 sink current and signal voltage 222 is near zero. (3) When the core 32 is near its reference point the difference voltage 270 will be between about 2.53 volts and 2.47 volts resulting in the output of voltage comparator 292 looking like an open and the output of voltage comparator 290 sinking current through resistor 294 producing a signal voltage 222 between about 2.5 and zero volts. Only a small range of movement of core 32 about its reference point, as adjusted by electrical adjuster 202, causes full change in signal voltage 222.

The schematic of the electronics of signal box 300 is shown on FIG. 7. Basically the signal box 300 receives a signal voltage 322 that is proportional to signal voltage 222 sent by control box 200 (in the preferred embodiment, the two voltages are essentially the same), and applies same to a logic circuit that turns on the appropriate lamp. The logic circuit comprises four voltage comparators and an electronic scheme is used to blink the lights when the supply voltage becomes too low. Specifically:

Power is supplied by 9 volt battery 312 connected between electrical common 310 and on-off switch 302, and is filtered by filter capacitor 314. Voltage used by most of the electronics is provided by voltage regulator 316 producing regulated 5 volts 320, which is filtered by filter capacitor 318 and (in the preferred embodiment) is also sent to control box 200.

Regulated 5 volts 320 and resistors 326, 327, and 328 are used to bias the four voltage comparators with about 3.33 volts on the noninverting inputs of voltage comparator 330 and voltage comparator 332, and about 1.37 volts on the inverting inputs of voltage comparator 334 and voltage comparator 336. Thus: (1) When signal voltage 322 is above about 3.33 volts (corresponding to core 32 being below its reference) the outputs of voltage comparator 330 and voltage comparator 332 will sink current and the outputs of voltage comparator 334 and voltage comparator 336 will look like opens. This causes low-light 308 to be on, and both OK-light 306 and high-light 304 to be off. (2) When signal voltage 322 is below about 1.67 volts (corresponding to core 32 being above its reference) the outputs of voltage comparator 330 and voltage comparator 332 look like opens and voltage comparator 334 and voltage comparator 336 are sinking current. This causes low-light 308 and OK-light 306 to be off and high-light 304 to be on. (3) When signal voltage 322 is between about 3.33 volts and 1.67 volts (corresponding to core 32 being near its reference point) all of the voltage comparators' outputs look like opens. This causes low-light 308 and high-light 304 to be off and, due to the inverting action of resistor 337 and NPN transistor 338, for OK-light 306 to be on.

When 9 volt battery 312 is supplying sufficient voltage so the voltage drop across resistor 348 keeps PNP transistor 347 turned on, then the input of Schmitt trigger 340 is high, the output of Schmitt trigger 340 is low, the inputs of parallel inverters 360, 361, 361, 362, 363, and 364 are low, and about 5 volts is applied through resistor 366 to the anodes of high-light 304, OK-light 306, and low-light 308. However, when 9 volt battery 312 is no longer able to keep PNP transistor 347 on, Schmitt trigger 340 becomes a relaxation oscillator with a frequency determined primarily by capacitor 344 and resistor 342. The oscillations on the output of Schmitt trigger 340, and thus on the inputs of parallel inverters 360, 361, 361, 362, 363, and 364, will cause the lights to blink, warning of the low battery condition.

An alternative embodiment for the split rod, as described above, is shown on FIG. 4. This variation is particularly suited for the determination of very small variations in elevation. A pin 120 is placed in the end of alternative hose float 52 so as to be essentially on the same axis as a depth micrometer's probe 122 where the depth micrometer's flange 123 is placed on the top of hose-end 18 with depth micrometer's dial 124 accessible above hose-end 18. A leg 126 with a foot 128 is firmly attached to hose-end 18 below alternative hose float 52 and hose 40 is dressed away to the side. The fixed distance between flange 123 and foot 128 is equivalent to fixed rod 80 and the adjustable probe 122 is equivalent to adjustable rod 90. Some sort of supporting structure (not shown on FIG. 4) is required to hold loosely hose-end 18 so as to maintain it plumb, while permitting vertical adjustment of the assembly to accommodate the surface below foot 128. The alternative embodiment shown on FIG. 4 is operated as follows:

Foot 128 is placed over the reference elevation and the system is adjusted until OK-light 306 is on. Then probe 122 is advanced downward until it just touches pin 120. Dial 124 is read and called the reference height.

Foot 128 is then placed over the next point to be measured and, when OK-light 306 is once again on, the probe 122 is advanced downward until it just touches pin 120. The difference in the dial readings is the elevation of the measured point with respect to the reference height.

An operator of this alternative embodiment of the split rod will wish to use the fluid reservoir shown in inventor Turloff's U.S. Pat. No. 4,231,163.

The floats used by the preferred embodiment have small bumps or short vertical protrusions on their sides to facilitate facile movement.

Alternate embodiments may be effected by the use of "wireless" methods for communicating between the control box 200 and the signal box 300. Such methods may take the form of modulated electromagnetic waves (such as light, or radio waves), or modulated mechanical waves (such as ultrasonic or sonic waves). FIG. 8 shows the arrangement. Control box 200 supplies its signal voltage 222 to modulator 140. The modulator 140 impresses the information on signal voltage 222 onto the electromagnetic or mechanical power emitted by wave launcher 142. Wave collector 144 receives some of the power emitted and supplies it to demodulator 146. Demodulator 146 removes the information and converts it into signal voltage 322 for processing by signal box 300.

A further alternative embodiment may be effected by substituting three different and distinct sounds for high-light 304, OK-light 306, and low-light 308.

A still further alternative embodiment may be effected by modifying the electronics so as to cause signal box 300 to indicate only whether control float 30 is too high or too low. The transition between these two indications is used in the same manner as the assertion of OK-light 306 in the preferred embodiment.

Although a preferred embodiment of the invention has been disclosed in detail, it will be recognized that variations or modifications lie within the scope of the present invention.

TABLE ONE

| Reference Number | Component |
| --- | --- |
| 202 | 10 kΩ potentiometer |
| 212 | 4.7 μF capacitor |
| 230 | 0.1 μF capacitor |
| 232 | 0.1 μF capacitor |
| 233 | 0.01 μF capacitor |
| 236 | 47 Ω resistor |
| 238 | 2N3904 NPN transistor |
| 240 | 39 kΩ resistor |
| 242 | 1N914 diode |
| 243 | 1N914 diode |
| 244 | 560 Ω resistor |
| 252 | 1N914 diode |
| 254 | 0.01 μF capacitor |
| 256 | 100 kΩ resistor |
| 262 | 1N914 diode |
| 264 | 0.01 μF capacitor |
| 266 | 100 kΩ resistor |
| 280 | 4.7 kΩ resistor |
| 282 | 100 Ω resistor |
| 284 | 4.7 kΩ resistor |
| 286 | 0.01 μF capacitor |
| 288 | 0.01 μF capacitor |
| 290 | ¼ LM339 voltage comparator |

TABLE ONE-continued

| Reference Number | Component |
| --- | --- |
| 292 | ¼ LM339 voltage comparator |
| 294 | 4.7 kΩ resistor |
| 296 | 4.7 kΩ resistor |

TABLE TWO

| Reference Number | Component |
| --- | --- |
| 302 | SPST switch |
| 304 | LED, red |
| 306 | LED, green |
| 308 | LED, red |
| 312 | 9 volt battery |
| 314 | 47 μF capacitor |
| 316 | LM2931 5 volt regulator |
| 318 | 47 μF capacitor |
| 324 | 4.7 μF capacitor |
| 326 | 39 kΩ resistor |
| 327 | 39 kΩ resistor |
| 328 | 39 kΩ resistor |
| 330 | ¼ LP339 voltage comparator |
| 332 | ¼ LP339 voltage comparator |
| 334 | ¼ LP339 voltage comparator |
| 336 | ¼ LP339 voltage comparator |
| 337 | 10 kΩ resistor |
| 338 | 2N3904 NPN transistor |
| 340 | 1/6 74HC14 Schmitt trigger |
| 342 | 10 kΩ resistor |
| 344 | 47 μF capacitor |
| 346 | 39 kΩ resistor |
| 348 | 39 kΩ resistor |
| 349 | 39 kΩ resistor |
| 360 | 1/6 74HC14 Schmitt trigger |
| 361 | 1/6 74HC14 Schmitt trigger |
| 362 | 1/6 74HC14 Schmitt trigger |
| 363 | 1/6 74HC14 Schmitt trigger |
| 364 | 1/6 74HC14 Schmitt trigger |
| 366 | 180 kΩ resistor |

We claim:

1. An electronic sensor for producing an indication of fluid level in a tube, comprising:

a float supported by the fluid, said float retaining a core essentially consisting of material having a relative magnetic permeability significantly greater than one;

a source of alternating current;

a middle coil encircling the tube and connected to said source of alternating current;

a top coil encircling the tube above said middle coil, said magnetic permeability of said float and the alternating current in said middle coil producing an induced AC voltage in said top coil corresponding to the position of said float within the tube;

a first rectifier circuit connected to said top coil, said first rectifier circuit capable of outputing a first DC voltage proportional to said induced AC voltage from said top coil;

a bottom coil encircling the tube below said middle coil, said magnetic permeability of said float and the alternating current in said middle coil producing an induced AC voltage in said bottom coil corresponding to the position of said float within the tube;

a second rectifier circuit connected to said bottom coil, said second rectifier circuit capable of outputing a second DC voltage proportional to said induced AC voltage from said bottom coil;

summing means for producing the indication of fluid level by summing said first DC voltage in a first polarity and said second DC voltage in a second opposite polarity: and an electronic buffer having an input connected to the indication of fluid level produced by said summing means and an output delivering a three state output signal. said three state output signal consisting of a high signal when said indication of fluid level indicates the fluid level is above a reference position related to the location of said top, middle and bottom coils by more than a small distance, a proportional signal when said indication of fluid level indicates the fluid level is within said small distance of said reference position, and a low signal when the indication of fluid level indicates the fluid level is below said reference position by more than said small distance.

2. An electronic sensor for producing an indication of fluid level in a tube, as related in claim 1, wherein said first rectifier circuit comprises a diode in series with a capacitor.

3. An electronic sensor for producing an indication of fluid level in a tube, as related in claim 1, wherein said second rectifier circuit comprises a diode in series with a capacitor.

4. An electronic sensor for producing an indication of fluid level in a tube, as related in claim 1, wherein said source of alternating current consists of a Colpitts type oscillator having said middle coil as its inductor.

5. An electronic sensor for producing an indication of fluid level in a tube, as related in claim 1, further comprising:

a source of adjustable voltage connected to said summing means, said source of adjustable voltage adjustable for setting said reference position of said electronic buffer; and said summing means further sums the voltage of said source of adjustable voltage with said first DC voltage in said first polarity and said second DC voltage in said second polarity.

6. An electronic sensor for producing an indication of fluid level in a tube, as related in claim 5, wherein said source of adjustable voltage includes a potentiometer.

7. An electronic sensor for producing an indication of fluid level in a tube, as related in claim 1, further including float limiting means for preventing said core, retained within said float, from rising significantly above the top of said top coil.

8. An electronic sensor, as related in claim 1, wherein said electronic buffer comprises:

a first fixed voltage;

a first voltage comparator having a first noninverting input, a first inverting input, and a first output, said first fixed voltage applied to said first inverting input;

a second fixed voltage smaller than said first fixed voltage;

a second voltage comparator having a second noninverting input, a second inverting input, and a second output, said first noninverting input and said second noninverting input connected to the indication of fluid level, said second fixed voltage applied to said second inverting input; and second summing means for producing said three state output signal at a first junction by combining the signal on said first output and the signal on said second output.

9. An electronic circuit, as related in claim 8, wherein said second summing means consists of:

a first resistor connected between said first output and said first junction;

a third fixed voltage;

a second resistor connected between said third fixed voltage and said first junction; and a wire connected between said second output and said first junction.

10. An electronic indicating circuit that produces one of three humanly perceptible indicators depending on whether an electronic sensor for producing an indication of fluid level in a tube indicates the fluid level is above a reference by more than a small distance, within the small distance of the reference, or below the reference by more than the small distance, comprising:

a float supported by the fluid, said float retaining a core essentially consisting of material having a relative magnetic permeability significantly greater than one;

a source of alternating current;

a middle coil encircling the tube and connected to said source of alternating current;

a top coil encircling the tube above said middle coil, said magnetic permeability of said float and the alternating current in said middle coil producing an induced AC voltage in said top coil corresponding to the position of said float within the tube;

a first rectifier circuit connected to said top coil, said first rectifier circuit capable of outputing a first DC voltage proportional to imported AC voltage from said top coil;

a bottom coil encircling the tube below said middle coil, said magnetic permeability of said float and the alternating current in said middle coil producing an induced AC voltage in said bottom coil corresponding to the position of said float within the tube;

a second rectifier circuit connected to said bottom coil, said second rectifier circuit capable of outputing a second DC voltage proportional to imported AC voltage from said bottom coil;

summing means for producing the indication of fluid level by summing said first DC voltage in a first polarity and said second DC voltage in a second opposite polarity;

a first fixed voltage;

a first voltage comparator having a first noninverting input, a first inverting input, and a first output, said first inverting input connected to the indication of fluid level, said first noninverting input connected to said first fixed voltage, and said first output connected to a first one of the humanly perceptible indicators actuated by the generation of said first output when the voltage on said first inverting input exceeds the voltage on said first noninverting input, thereby indicating the fluid level is above the reference by more than the small distance;

a second fixed voltage that is smaller than said first fixed voltage;

a second voltage comparator having a second noninverting input, a second inverting input, and a second output, said second inverting input connected to said second fixed voltage, said second noninverting input connected to the indication of fluid level, and said second output connected to a second one of the humanly perceptible indicators actuated by the generation of said second output when the voltage on said second inverting input exceeds the voltage on said second noninverting input, thereby indicating the fluid level is below the reference by more than the small distance; and electronic inverting means connected to a third one of the humanly perceptible indicators, for actuating the third indicator when neither said first output nor said second output are generated. thereby indicating the fluid level is within the small distance of the reference.

11. An indicating circuit, as recited in claim 10, wherein the indicators are located remotely from the tube within which said float is supported by the fluid.

12. An indicating circuit, as recited in claim 11, wherein said electronic inverting means comprises:

a third voltage comparator having a third noninverting input, a third inverting input, and a third output, said third inverting input connected to the indication of fluid level and said third noninverting input connected to said first fixed voltage;

a fourth voltage comparator having a fourth noninverting input, a fourth inverting input, and a fourth output, said fourth inverting input connected to said second fixed voltage, said fourth noninverting input connected to the indication of fluid level, and said third output and said forth output connected to a first node;

a third fixed voltage;

a first resistor connected between said third fixed voltage and said first node;

a transistor with a base, an emitter, and a collector, said base connected to said first node, said emitter connected to electrical ground. and said collector connected to said third indicator actuated when said transistor is turned ON.

13. An indicating circuit, as recited in claim 11, further comprising:

a primary supply voltage for providing power to the circuit; and pulsing means for enabling and disabling the humanly perceptible indicators in an oscillatory manner when said primary supply voltage becomes less than a predetermined level.

14. An indicating circuit, as recited in claim 13, wherein said pulsing means comprises:

a voltage regulator having an input terminal, an output terminal, and a reference terminal, said input terminal connected to said primary supply voltage, said output terminal connected to a secondary fixed voltage buss, and said reference terminal connected to electrical ground; and a switchable oscillator, connected to said input terminal and said output terminal, and having an output port connected to supply voltage to the humanly perceptible indicators. said switchable oscillator supplies a constant voltage on said output port when the voltage difference between said input terminal and said output terminal is greater than a predetermined level and that oscillates the voltage on said output port when the voltage difference between said input terminal and said output terminal is less than or equal to said predetermined level, such that the humanly perceptible indicators will be alternatively enabled and disabled.

15. An indicating circuit, as recited in claim 14, wherein said switchable oscillator comprises:

a transistor having a base, an emitter, and a collector, said emitter connected to said input terminal of said voltage regulator;

a first resistor connected between said base and said emitter;

a second resistor connected between said output terminal of said voltage regulator and said base;

an inverting Schmitt trigger having an input junction and an output junction;

a third resistor connected between said collector and said input junction of said inverting Schmitt trigger;

a capacitor connected between said input junction and electrical ground;

a forth resistor connected between said input junction and said output junction; and a buffer between said output junction of said inverting Schmitt trigger and said output port.

16. An indicating circuit, as recited in claim 15, wherein said buffer consists of at least one inverting Schmitt trigger.

17. An indicating circuit, as recited in claim 15, wherein said buffer consists of a fifth resistor.

18. An indicating circuit, as recited in claim 10, further comprising:

a source of adjustable voltage connected to said summing means, said source of adjustable voltage adjustable for setting the reference point of said electronic buffer; and said summing means further sums the voltage of said source of adjustable voltage with said first DC voltage in said first polarity and said second DC voltage second opposite polarity.

19. An indicating circuit, as recited in claim 18, wherein said source of adjustable voltage includes a potentiometer.

* * * * *